United States Patent [19]
Otte

[11] Patent Number: 4,934,214
[45] Date of Patent: Jun. 19, 1990

[54] DIFFERENTIAL GEARING

[75] Inventor: Erhard Otte, Bünde, Fed. Rep. of Germany

[73] Assignee: Gerhard Klemm Maschinenfabrik GmbH & Co., Bielefeld, Fed. Rep. of Germany

[21] Appl. No.: 343,327

[22] Filed: Apr. 25, 1989

[30] Foreign Application Priority Data

Apr. 30, 1988 [DE] Fed. Rep. of Germany ....... 3814678

[51] Int. Cl.⁵ .............................................. F16H 47/00
[52] U.S. Cl. ......................................... 74/720; 60/484
[58] Field of Search ................. 74/730, 718, 720, 655; 60/484; 91/499, 507

[56] References Cited

U.S. PATENT DOCUMENTS

| | | | |
|---|---|---|---|
| 2,029,981 | 2/1936 | Black | 74/720 X |
| 3,645,351 | 2/1972 | Muller | 74/718 X |
| 3,653,279 | 4/1972 | Sebern | 74/720 X |
| 4,606,428 | 8/1986 | Giere | 60/484 X |
| 4,848,187 | 7/1989 | Forghieri | 74/718 X |

FOREIGN PATENT DOCUMENTS 1241565 8/1971 United Kingdom .................. 74/720

Primary Examiner—Dirk Wright
Attorney, Agent, or Firm—Peter K. Kontler

[57] ABSTRACT

A differential gearing wherein a hydrostatic motor is flanked by two mechanical transmissions. The motor is an axial piston motor, a radial piston motor or a gear motor, and its main driving member rotates the input element of one of the transmissions. The rotary housing of the motor transmits torque to the input element of the other transmission. The motor and the transmissions can be installed in a common case, in discrete cases or directly in the hubs of the respective driven wheels.

13 Claims, 5 Drawing Sheets

DIFFERENTIAL GEARING

BACKGROUND OF THE INVENTION

The invention relates to differential gearings, for example, to gearings which can be used in motor vehicles to compensate for different rotational speeds of wheels when the vehicle is moving in a curve. More particularly, the invention relates to differential gearings which utilize hydrostatic motors.

Commonly owned copending patent application, Ser. No. 286,404 filed Dec. 16, 1988 and still pending discloses a differential gearing with a hydrostatic motor. The gearing employs a rotary mechanical drive at the input side, and the output shaft is connected with a cam disc for a radial piston motor. When a differential gearing of the just outlined character is used in a steered driven vehicle or the like, it is not possible to ensure differentiated transfer of the output RPM to the second wheel of the driven vehicle. In addition, and since the housing of the gearing rotates, it is necessary to resort to rather complex fluid admitting means. The fluid must be admitted axially at the output end of the gearing. This contributes to the dimensions of the gearing.

OBJECTS OF THE INVENTION

An object of the invention is to provide a simple, compact and inexpensive differential gearing.

Another object of the invention is to provide a versatile differential gearing which can be used in motor vehicles and for many other applications.

A further object of the invention is to provide a novel and improved combination of motor means and transmission means for use in the above outlined differential gearing.

An additional object of the invention is to provide a differential gearing which can operate with a single motor and need not employ any step-down transmissions.

Still another object of the invention is to provide a conveyance which embodies the above outlined differential gearing.

A further object of the invention is to provide a novel and improved case for use in the above outlined differential gearing.

An additional object of the invention is to provide a differential gearing which can be installed in existing conveyances or the like as a superior substitute for conventional gearings.

SUMMARY OF THE INVENTION

The invention is embodied in a differential gearing which can be used with advantage in the power trains of motor vehicles, for example, to control the rotation of rear wheels in a passenger car. The improved differential gearing comprises a hydrostatic motor including a rotary main driving member and a housing which is coaxial with and is rotatable relative to the main driving member, a case which receives the motor housing and is provided with at least one fluid-admitting inlet and at least one fluid-discharging outlet, and mechanical transmissions which flank the motor and each of which comprises a rotary input element and a rotary output element. The output elements of the transmission are or can be coaxial with each other, the input element of one of the transmissions is or can be coaxial with and receives torque from the main driving member of the motor, and the input element of the other transmission is or can be coaxial with and receives torque from the housing of the motor.

If the hydrostatic motor is a gear motor, the main driving member is a rotor which is installed in the housing. If the hydrostatic motor is a radial or axial piston motor, the main driving member is a cylinder block which is rotatably installed in the housing.

The case for the housing of the hydrostatic motor can be designed to accommodate the mechanical transmissions. Alternatively, each transmission can be installed in a discrete case.

Each transmission can include a gear train between the input element and the respective output element. The number of gears in one of the gear trains can depart from the number of gears in the other gear train. This is necessary when the motor is operative to rotate the main driving member and the housing in opposite directions.

The novel features which are considered as characteristic of the invention are set forth in particular in the appended claims. The improved differential gearing itself, however, both as to its construction and its mode of operation, together with additional features and advantages thereof, will be best understood upon perusal of the following detailed description of certain specific embodiments with reference to the accompanying drawing.

DESCRIPTION OF PREFERRED EMBODIMENTS

Figure 1:
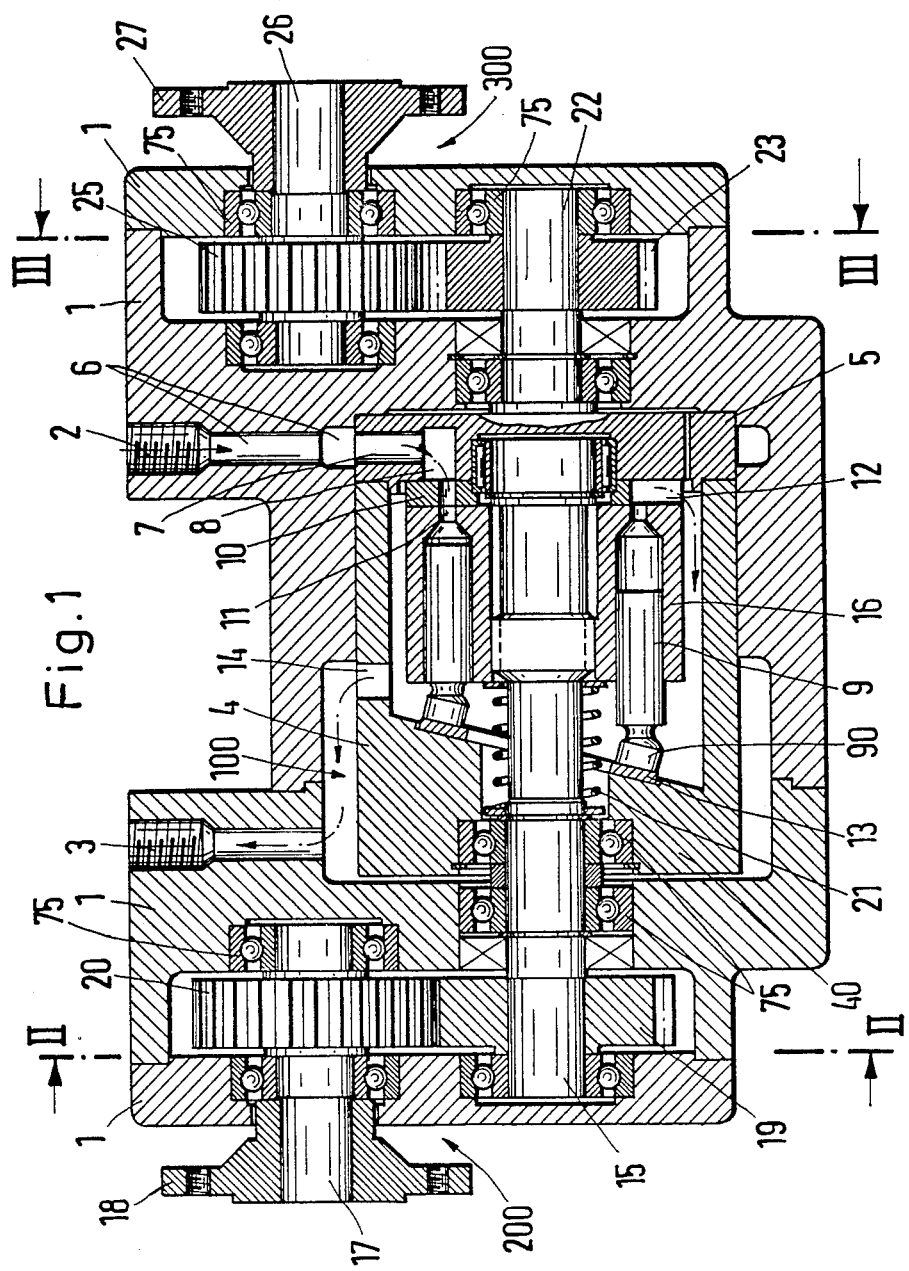
FIG. 1 is a sectional view of a differential gearing which embodies one form of the invention and wherein the hydrostatic motor is an axial piston motor, the section being taken in the direction of arrows as seen from the line I—I in FIG. 2 or in the direction of arrows as seen from the line I—I in FIG. 3.
Figure 2:
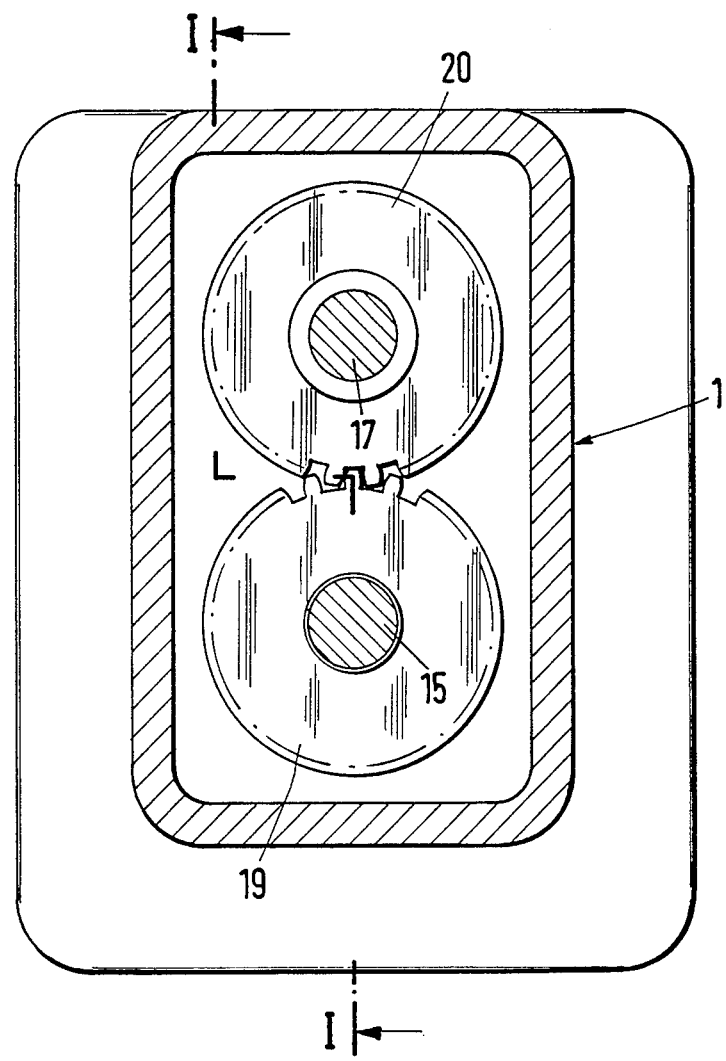
FIG. 2 is a transverse sectional view as seen in the direction of arrows from the line II—II of FIG. 1.
Figure 3:
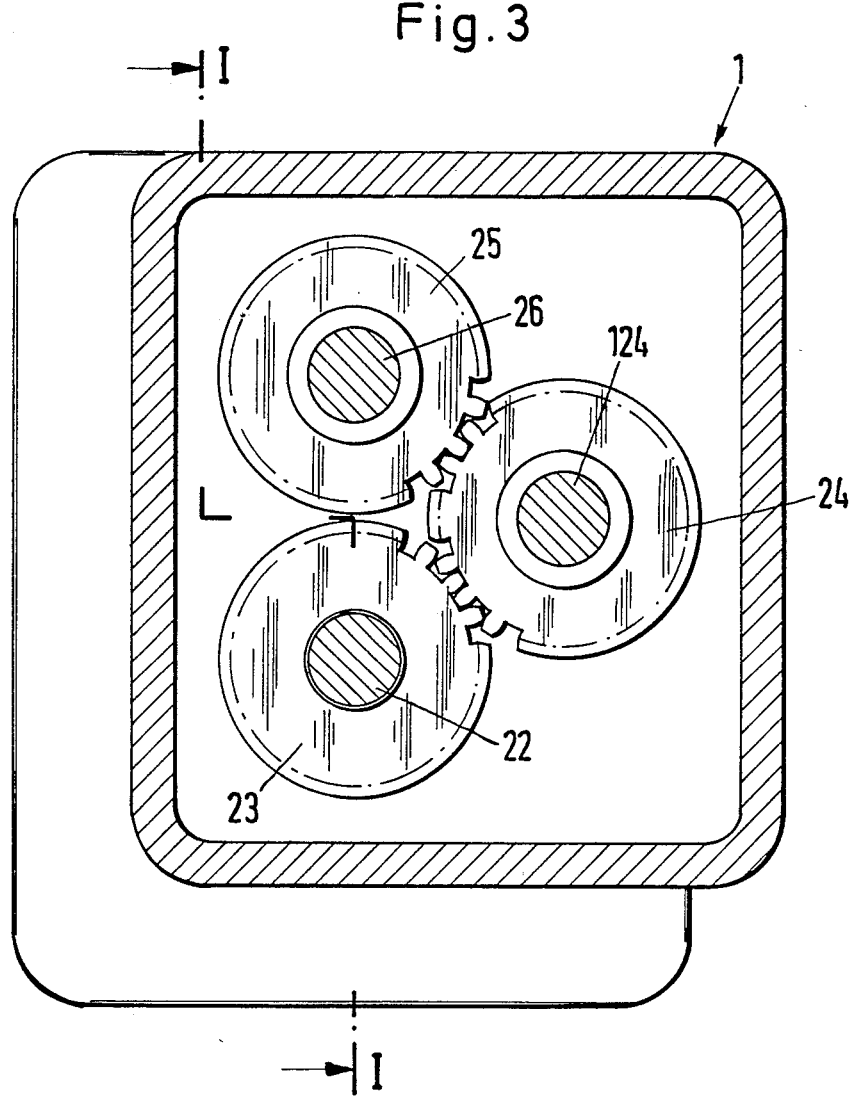
FIG. 3 is a transverse sectional view as seen in the direction of arrows from the line III—III of FIG. 1.

FIGS. 1 to 3 show a differential gearing which comprises a hydrostatic motor 100 flanked by two mechanical transmissions 200 and 300. A common case 1 is provided to confine the motor 100 and the two transmissions. This case has an inlet 2 for admission of pressurized fluid (e.g., oil) to the motor 100, and an outlet 3 for evacuation of spent fluid to the sump or to another source, not shown.

The hydrostatic motor 100 of FIG. 1 is an axial piston motor having a housing 4 which is rotatably mounted in the central portion of the case 1 and includes a separately produced end wall 5. The cylinders in the cylinder block 16 in the housing 4 receive pressurized hydraulic fluid from the inlet 2 by way of an annular channel 6 in the case 1, a channel 7 which is provided in the end wall 5 and communicates with the channel 6, and a channel 8 which is also provided in the end wall 5. The pistons 9 in the cylinder block 16 in the housing 4 have followers 90 which abut a suitably inclined wobble plate or tilting plate 13. The latter abuts a ramp 40 forming part of the respective end wall of the housing 4. The end wall 5 of the housing 4 is outwardly adjacent a valve plate 10 which has a passage 11 communicating with the channel 8 of the end wall 5. The valve plate 10 is further provided with a radially outwardly extending passage 12 which admits spent fluid into the space between the housing 4 and cylinder block 16. Such space communicates with an opening 14 which is provided in the housing 4 and conveys spent fluid toward the outlet 3 of the case 1.

Pressurized fluid which is admitted into successive chambers of the cylinder block 16 via passage 11 of the valve plate 10 acts upon the respective pistons 9 so that the tiltable followers 90 of such pistons bear against the wobble plate 13. When the cylinder block 16 rotates, certain pistons 9 move axially toward the valve plate 10 and thereby expel fluid from the respective cylinder chambers via passage 12.

The motor housing 4 and its end wall 5 can rotate in the central portion of the case 1. The cylinder block 16 can be said to constitute the main driving member of the motor 100 and is connected for rotation with a shaft 15 which constitutes the input element of the mechanical transmission 200. The unit including the input element 15 and the main driving member or cylinder block 16 can rotate relative to the case 1 as well as with reference to the housing 4 and a shaft 22 which is rigid with the housing and constitutes the input element of the mechanical transmission 300.

The transmission 200 further comprises a rotary output element 17 in the form of a shaft which is rotatably journalled in the respective end portion of the case 1, and a gear train including a first gear 19 on the input element 15 and a second gear 20 which is mounted on or is integral with the output element 17 and mates with the gear 19. The gears 19, 20 cause the output element 17 to rotate counter to the direction of rotation of the input element 15 and main driving member or cylinder block 16. The output element 17 carries a flange 18 which can connect it to a driven component, e.g., to the hub of a wheel in a motor vehicle.

The mechanical transmission 300 comprises the aforementioned input element 22, an output element 26 which is or can be coaxial with the output element 17 of the transmission 200, and a gear train including three gears, namely a first gear 23 on the input element 22, a second gear 25 on the output element 26, and a third gear 24 which is mounted on an intermediate shaft 124 (FIG. 3) and mates with the gears 23 and 25.

The housing 4 and the input element 22 rotate counter to the direction of rotation of the main driving member 16 and input element 15. The gear train 23-25 causes the output element 26 to rotate in the same direction as the input element 22; therefore, the output elements 17 and 26 of the transmissions 200, 300 rotate in the same direction. The output element 26 carries a flange 27 which can transmit torque to another wheel in a motor vehicle.

FIG. 1 further shows numerous antifriction bearings 75 for the input elements 15, 22, output elements 17, 26 and housing 4.

A stressed coil spring 21 is employed to bias the cylinder block 16 and the valve plate 10 axially against the inner side of the end wall 5; this coil spring reacts against a split ring on the input element 15 and bears against the adjacent axial end of the cylinder block 16.

The mode of operation is as follows:

Pressurized oil or another hydraulic fluid which is admitted into the inlet 2 of the case 1 flows through the channels 6, 7, 8 and the passage 11 of the valve plate 10 to enter the chambers of the cylinder block 16 and to urge the followers 90 of the respective pistons 9 against the wobble plate 13. When the force with which the followers 90 bear against the wobble plate 13 reaches a certain value, the main driving member 16 and the input element 15 on the one hand, and the housing 4 and input element 22 on the other hand, begin to rotate relative to each other. Those pistons 9 which are caused to move toward the end wall 5 expel fluid from the respective cylinder chambers via passage 12, and such fluid flows toward and into the outlet 3 of the case 1 by way of the opening 14 in the housing 4 and the annular space between the central portion of the case and the periphery of the housing 4.

The input element 15 drives the output element 17 and its flange 18 by way of the gear train 19, 20, and the input element 22 drives the output element 26 and its flange 27 by way of the gear train 23-25. As mentioned above, the output elements 17, 26 rotate in the same direction.

One of the output elements 17, 26 can revolve at a higher speed than the other output element, the two output elements can rotate at the same speed, and one of the output elements can be idle while the other output element rotates. The input elements 15 and 22 rotate in opposite directions; therefore, the number of gears in the gear train of the transmission 200 differs from the number of gears in the gear train of the transmission 300.

The differential gearing can be used in steered or machine-guided vehicles or the like. The transmission ratio of the gear train in the transmission 200 is identical to that of the gear train in the transmission 300 if the diameters of the driven wheels are the same. If the diameters of the driven wheels are different, the transmission ratios of the transmissions 200 and 300 are inversely proportional to the diameters of the wheels.

An important advantage of the improved differential gearing is its simplicity. Moreover the gearing is compact and includes a small number of component parts. For example, it is not necessary to provide a discrete hydraulic motor and a discrete step-down transmission for each driven wheel in a motor vehicle wherein the improved differential gearing is put to use. The provision of a common case for the motor 100 and transmissions 200, 300 also contributes to compactness and simplicity of the differential gearing of FIGS. 1 to 3.

Figure 4:
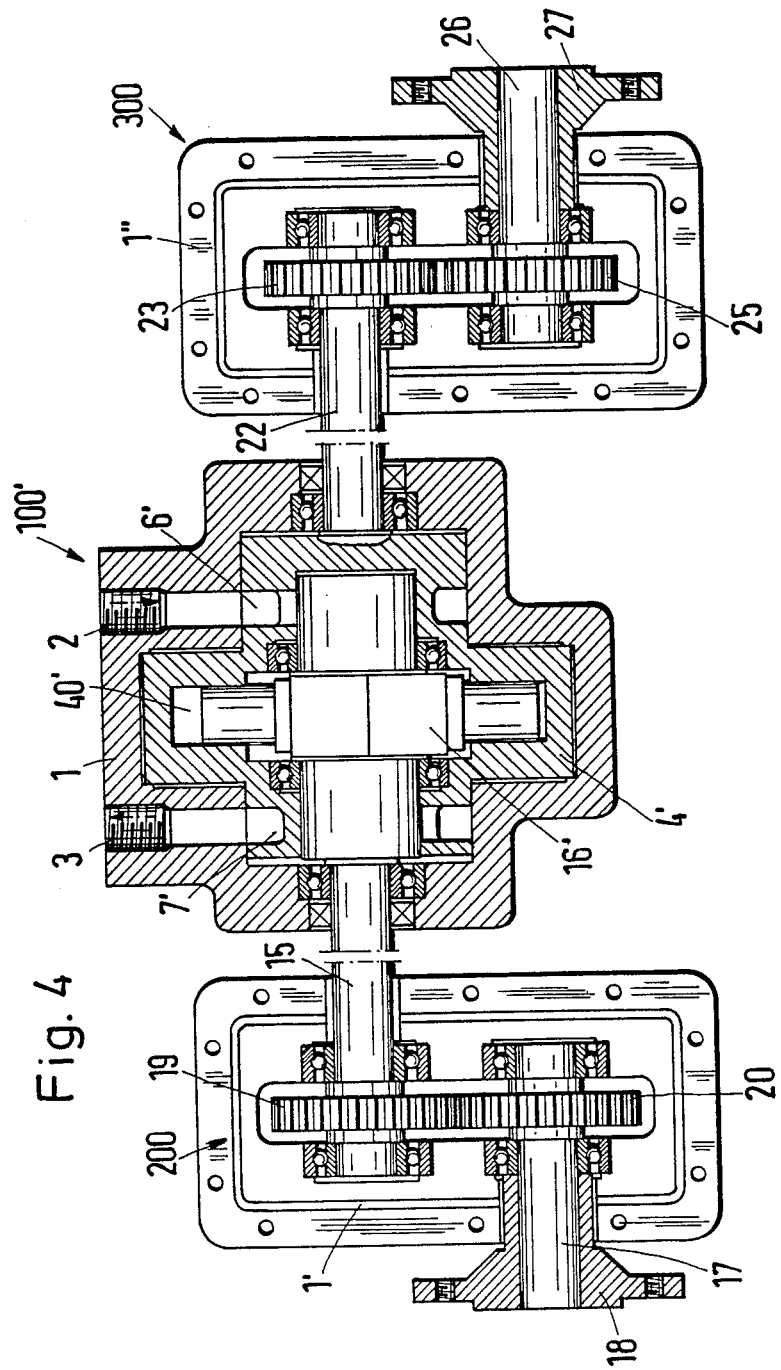
FIG. 4 is a sectional view similar to that of FIG. 1 but showing a differential gearing wherein the hydrostatic motor is a radial piston motor and the mechanical transmissions are installed in discrete cases.

FIG. 4 shows a second differential gearing which comprises three discrete cases, namely a first case 1 for a hydrostatic motor 100', a second case 1' for the mechanical transmission 200, and a third case 1" for the mechanical transmission 300. The transmissions 200 and 300 are or can be identical with the similarly referenced transmissions of the differential gearing which is shown in FIGS. 1 to 3 and their parts are denoted by similar reference characters. The third gear (note the gear 24 in FIG. 3) of the power train in the case 1" is not shown in FIG. 4.

Another difference between the differential gearings of FIGS. 1 to 3 and 4 is that the hydrostatic motor 100' in the case 1 of the gearing of FIG. 4 is a radial piston motor.

The cylinder block 16' of the motor 100" constitutes the main driving member and transmits torque to the input element 15 of the transmission 200. The housing 4' of the motor 100' transmits torque to the input element 22 of the transmission 300. The exact details of the radial piston motor 100' are not shown in FIG. 4. Such motor can be of conventional design. FIG. 4 merely shows a cam 40' which surrounds a set of radially extending pistons in the cylinder chambers of the block 16' and can be said to constitute a functional equivalent of the wobble plate 13 for the pistons 9 in the axial piston motor 100 of FIG. 1. Pressurized hydraulic fluid is admitted via inlet 2 and flows through channels 6' into and through channels 7' downstream of the radially extending cylinder chambers of the block 16' on its way toward the outlet 3. The operation of the motor 100' is substantially identical to that of the motor 100.

The cases 1' and 1" can be omitted if the transmissions 200 and 300 are installed directly in the hubs of wheels which ar to receive torque from the output elements 17 and 26. In other words, the cases 1' and 1" can be considered as component parts of two wheels.

Figure 5:
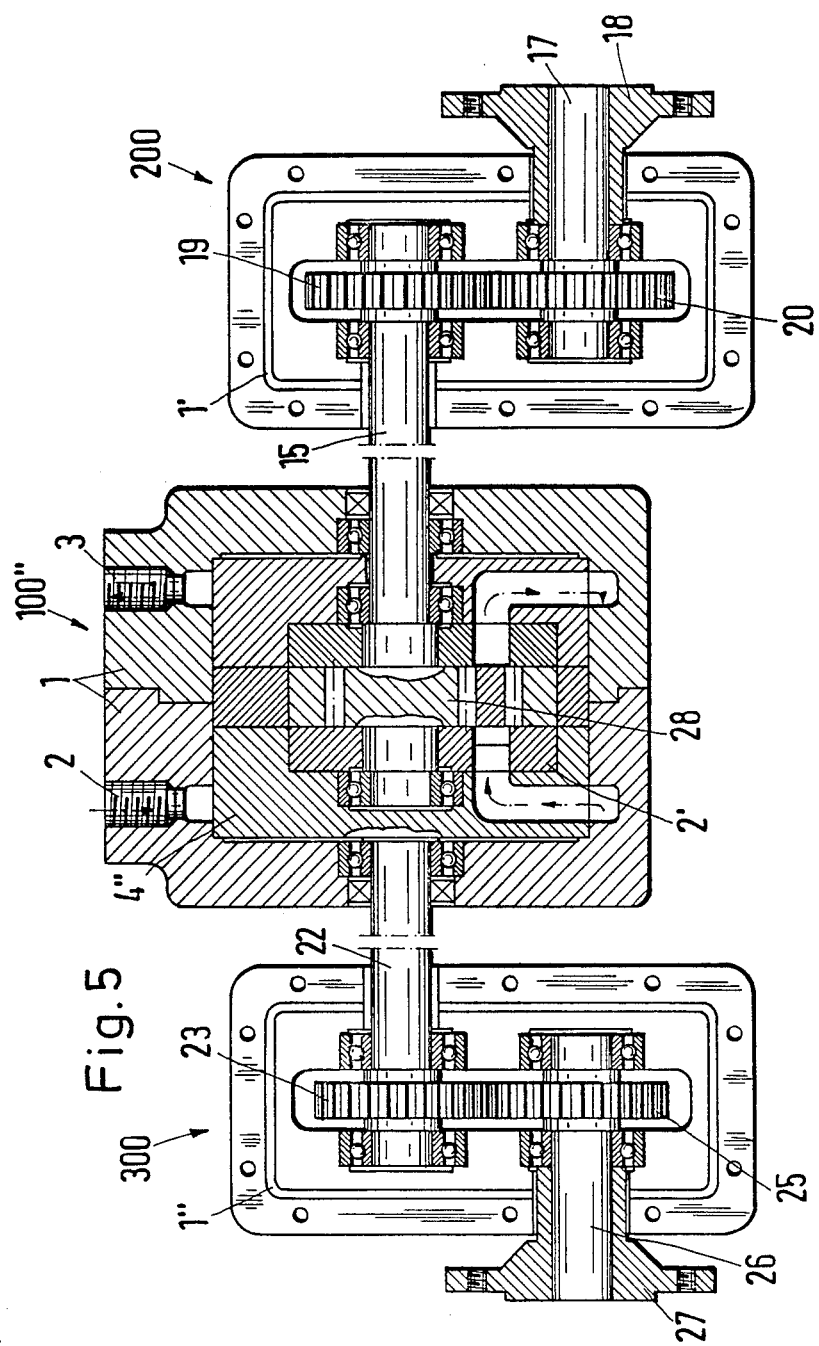
FIG. 5 is a sectional view similar to that of FIG. 4 but showing a differential gearing wherein the hydrostatic motor is a gear motor.

Referring to FIG. 5, there is shown a differential gearing which is identical with that of FIG. 4 except that the hydrostatic motor 100" is a gear motor and the positions of mechanical transmissions 200, 300 are reversed. All parts which are identical with or analogous to the parts of the differential gearing of FIGS. 1–3 or FIG. 4 are denoted by similar reference characters.

The direction of fluid flow from the inlet 2 to the outlet 3 of the case 1 for the motor 100" is counter to the direction of flow in the case 1 of FIG. 1 or 4. The exact construction of the gear motor 100" forms no part of the invention; FIG. 5 merely shows a rotor 2' and a gear 28 constituting the main driving member of the differential. The housing 4" of the motor 100" transmits torque to the input element 22 of the transmission 300, and the gear 28 transmits torque to the input element 15 of the transmission 200. The rotor 2' is a functional equivalent of the cylinder block 16 or 16'. The mode of operation of the hydrostatic gear motor 100" is analogous to that of the motor 100 or 100'. The main difference is that the flow of hydraulic fluid from the inlet 2 to the outlet 3 is somewhat different in order to account for structural differences between the motor 100" on the one hand and the motor 100 or 100' on the other hand.

The improved differential gearing can be used in steered driven vehicles as well as for many other purposes. When used in vehicles, it ensures that the wheel at the inner side of the curve can rotate at a speed which is less than the speed of the wheel at the outer side of the curve. Similar situations can arise when heavy materials are to be transported to or from a selected locale in a plant or the like. In heretofore known gearings (especially when the motor is a hydraulic motor), it is necessary to provide a hydraulic motor and an associated step-down transmission for each driven wheel. This contributes to the initial and maintenance cost and lowers the efficiency without ensuring a genuine differential operation.

An axial piston pump which can be used in the of the present invention is disclosed differential gearing of the present invention is disclosed in German Auslegeschrift No. 21 44 063. A radial piston pump which can be used in the differential gearing of the present invention is disclosed in German Utility Model No. 74 25 346. Mechanical transmissions which can be used in the differential gearing of the present invention are disclosed in German Offenlegungsschrift No. 30 04 581, German Offenlegungsschrift No. 35 46 420 and German Auslegeschrift No. 24 19 053.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A differential gearing comprising a hydrostatic motor including a rotary main driving member and a housing coaxial with and rotatable relative to said main driving member; and mechanical transmissions flanking said motor and having discrete rotary input elements and rotary output elements, one of said input elements receiving torque from said main driving member and the other of said output elements receiving torque from said housing.

2. The differential gearing of claim 1, wherein said main driving member comprises a rotor installed in said housing and drivingly connected with said one input element.

3. The differential gearing of claim 1, wherein said main driving member comprises a cylinder block installed in said housing and connected with said one input element.

4. The differential gearing of claim 1, further comprising a case for said housing, said case having a fluid-admitting inlet and a fluid-discharging outlet.

5. The differential gearing of claim 1, wherein said motor is an axial piston motor.

6. The differential gearing of claim 1, wherein said motor is a radial piston motor.

7. The differential gearing of claim 1, wherein said motor is a gear motor.

8. The differential gearing of claim 1, further comprising a common case for said motor and said transmissions.

9. The differential gearing of claim 1, further comprising discrete cases for said motor and each of said transmissions.

10. The differential gearing of claim 1, wherein each of said transmissions comprises a gear train between the input element and the respective output element, one of said gear trains having a first number of gears and the other of said gear trains having a different second number of gears.

11. The differential gearing of claim 10, wherein said motor is operative to rotate said main driving member and said housing in opposite directions.

12. The differential gearing of claim 1, wherein said one input element is coaxial with said main driving member and said other output element is coaxial with said housing.

13. The differential gearing of claim 1, wherein said output element of said first transmission is coaxial with the output element of said second transmission.

* * * * *